United States Patent
Shah et al.

(10) Patent No.: US 10,324,826 B2
(45) Date of Patent: Jun. 18, 2019

(54) DEVELOPER CHANNEL COMPLIANCE

(71) Applicant: Focus IP Inc., Boise, ID (US)

(72) Inventors: Faisal Shah, Boise, ID (US); Chris Bura, Walnut Creek, CA (US)

(73) Assignee: Focus IP Inc., Boise, ID (US)

( * ) Notice: Subject to any disclaimer, the term of this patent is extended or adjusted under 35 U.S.C. 154(b) by 223 days.

(21) Appl. No.: 15/199,038

(22) Filed: Jun. 30, 2016

(65) Prior Publication Data

US 2016/0321167 A1 Nov. 3, 2016

Related U.S. Application Data

(63) Continuation-in-part of application No. 14/178,473, filed on Feb. 12, 2014, now Pat. No. 9,396,237.

(60) Provisional application No. 62/188,163, filed on Jul. 2, 2015, provisional application No. 61/881,279, filed on Sep. 23, 2013, provisional application No. 61/763,675, filed on Feb. 12, 2013.

(51) Int. Cl.
| | |
|---|---|
| *G06F 8/61* | (2018.01) |
| *G06F 11/36* | (2006.01) |
| *H04L 29/08* | (2006.01) |
| *H04W 4/50* | (2018.01) |

(52) U.S. Cl.
CPC ............ *G06F 11/3668* (2013.01); *G06F 8/61* (2013.01); *H04L 67/02* (2013.01); *H04L 67/34* (2013.01); *H04W 4/50* (2018.02)

(58) Field of Classification Search
CPC ........ G06F 11/3668; G06F 8/61; H04W 4/50; H04L 67/02; H04L 67/34

USPC ......................................................... 717/135
See application file for complete search history.

(56) References Cited

U.S. PATENT DOCUMENTS

| | | | |
|---|---|---|---|
| 6,401,118 B1 * | 6/2002 | Thomas | G06F 21/10 707/999.004 |
| 7,016,800 B1 * | 3/2006 | Nguyen | G06F 11/3664 702/108 |
| 7,346,605 B1 | 3/2008 | Hepworth et al. | |
| 7,941,525 B1 * | 5/2011 | Yavilevich | G06Q 30/02 709/203 |
| 8,010,511 B2 | 8/2011 | Brock | |
| (Continued) | | | |

OTHER PUBLICATIONS

U.S. Appl. No. 14/178,473, NonFinal Office Action dated Nov. 16, 2015; 19 pages.

(Continued)

*Primary Examiner* — Duy Khuong T Nguyen
*Assistant Examiner* — Theodore E Hebert
(74) *Attorney, Agent, or Firm* — Adsero IP

(57) ABSTRACT

Novel tools and techniques might provide for implementing application programming interface ("API") use compliance, and, in some cases, by implementing application auditing for API use compliance within virtual environments in which target APIs are executed. In some embodiments, a method might comprise identifying misuse of an application programming interface ("API") that is used in a developer channel, by intercepting data streams between the API and one or more computing systems, parsing the intercepted data streams, and determining whether the API is use noncompliant, based at least in part on identifying use non-compliant characteristics in the parsed data streams.

26 Claims, 7 Drawing Sheets

(56) References Cited

U.S. PATENT DOCUMENTS

| | | | | |
|---|---|---|---|---|
| 8,627,484 B2* | 1/2014 | Beckley | ............... | H04W 4/02 |
| | | | | 726/26 |
| 9,396,237 B1* | 7/2016 | Shah | ............... | G06Q 10/10 |
| 2002/0174132 A1 | 11/2002 | Silverman | | |
| 2008/0046412 A1 | 2/2008 | Lee | | |
| 2008/0065611 A1 | 3/2008 | Hepworth et al. | | |
| 2010/0115585 A1* | 5/2010 | Cohen | ............... | G06F 21/53 |
| | | | | 726/3 |
| 2012/0240236 A1 | 9/2012 | Wyatt | | |
| 2013/0347094 A1* | 12/2013 | Bettini | ............... | H04L 63/0245 |
| | | | | 726/11 |
| 2014/0068639 A1* | 3/2014 | Schrock | ............... | G06F 9/54 |
| | | | | 719/328 |

OTHER PUBLICATIONS

U.S. Appl. No. 14/178,473, Notice of Allowance dated Mar. 17, 2016; 12 pages.

* cited by examiner

400

DEVELOPER CHANNEL COMPLIANCE

CROSS-REFERENCES TO RELATED APPLICATIONS

This application claims priority to U.S. Patent Application Ser. No. 62/188,163 (the "'163 application"), filed Jul. 2, 2015 by Faisal Shah et al. and titled, "Developer Channel Compliance".

This application is also a continuation-in-part application of U.S. patent application Ser. No. 14/178,473 (the "'473 application"; now U.S. Pat. No. 9,396,237), filed Feb. 12, 2014 by Faisal Shah et al. and titled, "Monitoring Applications for Infringement", which claims priority to U.S. Patent Application Ser. No. 61/763,675 (the "'675 application"), filed Feb. 12, 2013 by Faisal Shah et al. and titled, "Monitoring of App Stores" and U.S. Patent Application Ser. No. 61/881,279 (the "'279 application"), filed Sep. 23, 2013 by Faisal Shah et al. and titled, "Monitoring Applications for Infringement".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing application programming interface ("API") use compliance, and, in particular embodiments, to methods, systems, and computer software for implementing application auditing for API use compliance within virtual environments in which target APIs are executed.

BACKGROUND

Software developers often use application programming interfaces ("API's") during the development of mobile applications. The use of an official API requires that the developer, and API provider (hereinafter, "API provider" or "API owner"), enter into a written agreement stating that they will abide by the Terms of Service ("TOS") specific to developer access to the API. The API provider will provide a set of unique identifiers (or keys) to the developer upon acceptance of the TOS or Developers Agreement. Currently, API owners are responsible for the ongoing compliance management of their developers throughout the life-cycle of the application. Management of compliance on an official API is fairly straight-forward. However, those same applications that are outside of the API owner's system become problematic to audit. There are some common areas of abuse for most API providers including, but not limited to, Trademark Use/Abuse, Copyright or Logo Use/Abuse, Common Abuses Using Official API(s), and/or the like.

In some cases, Trademark Use/Abuse might include, without limitation, (1) the brand (inappropriately or inaccurately) implying partnership, sponsorship or endorsement; (2) use of part or all of a trademark phrase or title in the company or app title without explicit consent from the trademark holder; (3) the developer including any sort of manipulation or distortion of the trademarked term, which could include, but is not limited to, using foreign language equivalents, phonetic equivalents, or use of letter or number equivalents, and/or the like; (4) using a trademarked term in the Description of the App without additional words such as "for," "powered by," or "compatible with" (which is generally permitted if those additional words are used); and/or the like.

Copyright or Logo Use/Abuse might include, but is not limited to, (i) using the official logo, when using their official API (which is usually not permitted by brand holders); (ii) using part or whole of an owned graphic or logo as the company or product logo of a non-affiliated application; (iii) using the official logo within the application (instead of using a platform provided developer logo); (iv) creating similar copyrighted images, or logos to imitate official copyrighted material owned by the platform, thus creating confusion with the developer's application and the official application; and/or the like.

Common Abuses Using Official API(s) might include, without limitation, (a) using the official API in order to reverse engineer the core product(s), website(s), dashboard(s), or stream(s); (b) failing to verify that applications are safe and secure, adhering to specific industry standards such as the Open Web Application Security Project ("OWASP"); (c) developing the application without some form of integrated error handling; (d) developing the app such that the functionality, reliability, or performance of the app is not to the standards set in the Developer Agreement or Terms of Service; (e) using a deprecated API in an application, contrary to the API provider's explicitly statements in their Terms of Service; (f) developing a mobile application that is not properly encoded or that is using a character set encoding that is not approved by the API owner; (g) attempting, by a developer, to conceal its identity during the process of entering into a developers agreement, in order to receive API credentials ("keys"); (h) failing to implement safeguards that can limit the amount of data that can be requested from an official API; (i) developing an application so that an official API can be used to spam, incentivize, or harass users; (j) using data from an official API in order to create advertisements or marketing materials, or for targeted advertising campaigns; (k) using the official API use to disrupt, negatively affect, or inhibit the user experience; (l) making any attempt to circumvent any content-filtering techniques; (m) using an official API for any application that constitutes, promotes, or is used in connection with spyware, adware, or any other malicious programs or code; (n) using data that is harvested, or scraped from an API owners website, and is used to supplement the data provided from the API; (o) using multiple member tokens ("oAuth") to circumvent any restrictions put in place by the platform, such as showing non-registered members' content from the platform (each user must authenticate individually); (p) attempting to access services that the developer is not authorized to access normally, through use of the official API; (q) copying or distributing any object related code that calls the API (which is considered part of the API, and is solely for inclusion as part of API Client(s)); and/or the like.

Hence, there is a need for more robust and scalable solutions for implementing API use compliance, by, e.g., implementing application auditing for API use compliance within virtual environments in which target APIs are executed, or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
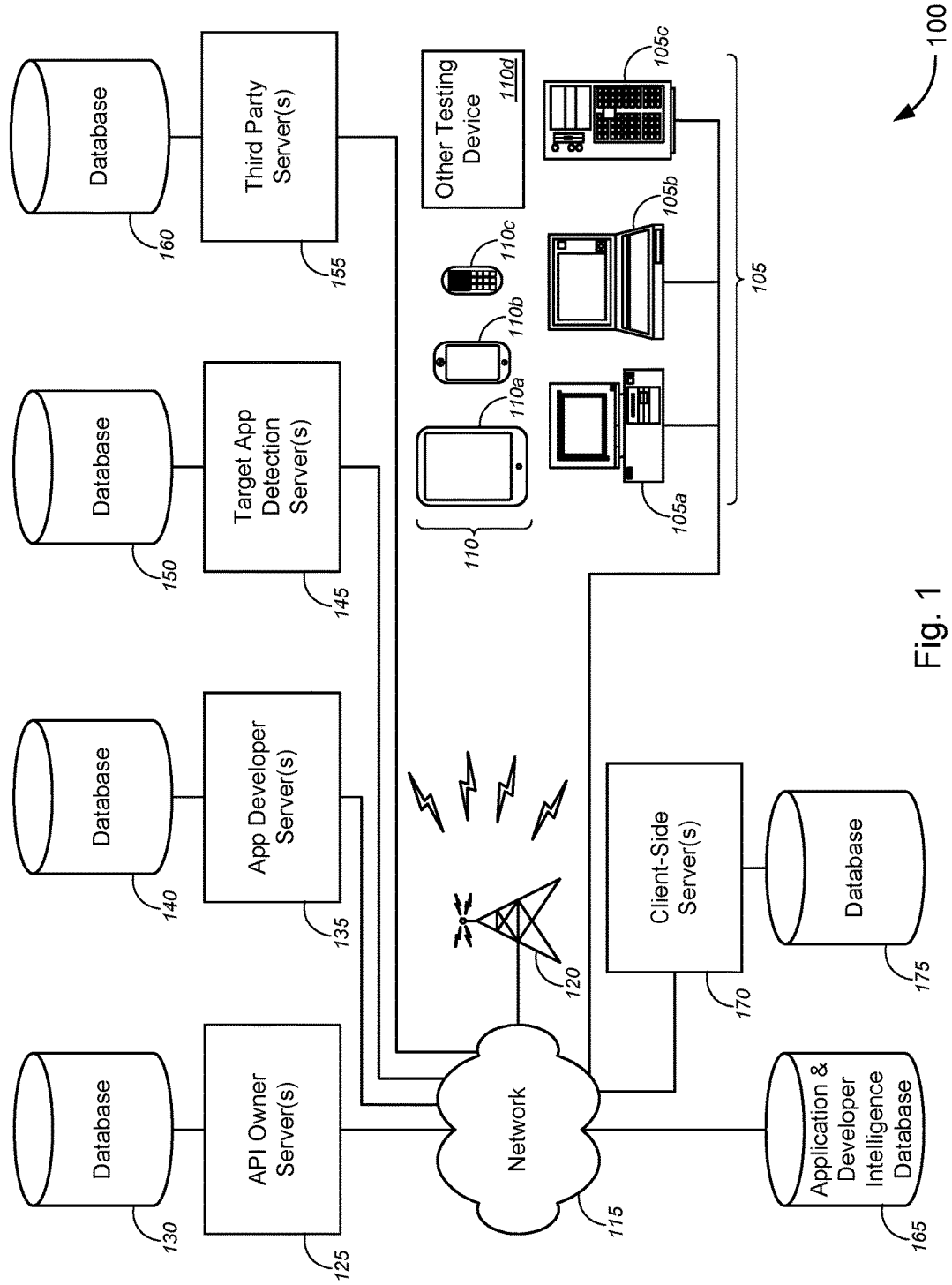
FIG. 1 is a schematic diagram illustrating a system for implementing application auditing for API use compliance, in accordance with various embodiments.

Various embodiments provide techniques for implementing application programming interface ("API") use compliance, and, in some cases, by implementing application auditing for API use compliance within virtual environments in which target APIs are executed.

DevCom technology, which refers in general to the techniques and systems described herein, allows the brand holder to identify the misuse of API platforms, allowing the auditing of the developer channel for compliance. Data streams are parsed for specific information that is used to determine if the developers are in compliance with the policy set forth in the developer TOS.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, application compliance technology, API compliance determination technology, and/or the like. In other aspects, certain embodiments, can improve the functioning of a computer or network system itself (e.g., computing devices or systems that form parts of the network, computing devices or systems on which applications are executed, etc.), for example, by enabling implementation of automatic auditing of apps to ensure that system efficiencies are maintained and that API use conforms to set standards (which may be defined in Terms of Service or in Developer Agreements, etc.), and/or the like. In particular, to the extent any abstract concepts are present in the various embodiments, those concepts can be implemented as described herein by devices, software, systems, and methods that involve specific novel functionality (e.g., steps or operations), such as implementing automatic auditing of a developer channel or developer app for API use compliance, intercepting data streams between the API and one or more computing systems, parsing the intercepted data streams, and determining whether the API is use non-compliant, based at least in part on identifying use non-compliant characteristics in the parsed data streams, and/or the like, to name a few examples, that extend beyond mere conventional computer processing operations. These functionalities can produce tangible results outside of the implementing computer system, including, merely by way of example, ability to automatically audit apps that are outside an API owner's system to determine API use compliance, which might affect operation use parameters and operational efficiencies and/or might incur legal liability, which would effectively shut down use of the app and/or the API, any of which may be observed or measured by customers and/or service providers.

In an aspect, a method might be provided for automatically auditing a developer channel for use compliance. The method might comprise identifying, with a first computer, a target application ("app") in an on-line app store that may be non-compliant in terms of use of an application programming interface ("API"); downloading and installing, with a test device, the target app on the test device; establishing a virtual environment in a network to which the test device is connected, the virtual environment being configured to simulate replication of a validation process for the target app and to forward validation requests to a second computer associated with a service provider that owns the API ("API owner"); surveying, with the virtual environment, at least one flow of information to or from the target app via the API; generating a unique identifier ("unique ID") for the target app; testing, with the test device, the target app; transmitting, with the test device, data to a client-side server; capturing the one or more data streams travelling both ways between the test device and the client-side server while the data is being transmitted from the test device to the client-side server; storing, in a database in or communicatively coupled with the virtual environment, at least one of the captured one or more data streams or a log of the captured one or more data streams; and generating and validating one or more certificate of authority requests required by the client-side server.

According to some embodiments, identifying, with the first computer, the target app might comprise identifying, with the first computer, characteristics of an app that are indicative of non-compliant use of the API. In some cases, the characteristics of the app that are indicative of non-compliant use of the API might include both indicators that an official version of the API is in use and indicators that there is a strong likelihood that the target app is violating use policies under an official Terms of Service of the API owner that is agreed to by a developer of the target app. Alternatively, or additionally, identifying, with the first computer, the target app might comprise receiving, with the first computer, information from at least one of the API owner or a third party identifying the target app as potentially being use non-compliant.

Merely by way of example, in some embodiments, the information in the flow of information to or from the target app via the API might comprise at least one of information indicating API version, unique user identifier ("UUID") associated with a user using the target app, information indicating that authorization certificates have been sent, the authorization certificates, or the unique ID for the target app, and/or the like. In some instances, the information in the flow of information to or from the target app via the API is obtained from at least one of header information, one or more hypertext transfer protocol ("HTTP") or secure HTTP ("HTTPS") requests, or one or more HTTP or HTTPS responses. In some cases, capturing the one or more data streams might comprise capturing one or more data streams for each of the one or more HTTP or HTTPS requests or the one or more HTTP or HTTPS responses.

In some embodiments, the test device is a mobile device comprising at least one of a tablet computer, a laptop computer, a smart phone, a mobile phone, or a mobile testing device, and/or the like. Alternatively, the test device might comprise at least one of a server computer, a cloud computing-based test device, a desktop computer, or a network server node, and/or the like.

According to some embodiments, the method might further comprise detecting and retaining forensic information during input and output data streams. In some instances, the forensic information comprises at least one of application identification ("app ID"), one or more API keys, advertiser network information, or payment processor information, and/or the like.

In another aspect, a method might comprise downloading and installing, with a test device and from an on-line app store, a target application ("app") that has been identified as being potentially non-compliant in terms of use of an application programming interface ("API") that is part of the target app, and establishing and interacting with, within one of the test device or a network to which the test device is communicatively coupled, a virtual environment. The virtual environment might be configured to simulate replication of a validation process for the target app and to forward validation requests to a client-side server associated with an owner of the API. The method might further comprise capturing, with one of the test device or a virtual machine running on the virtual environment, one or more data streams for input and output requests during data exchange between the test device and the client-side server, and analyzing the captured one or more data streams to determine whether API use by the target app is compliant.

Merely by way of example, in some instances, the test device is a mobile device comprising at least one of a tablet computer, a laptop computer, a smart phone, a mobile phone, or a mobile testing device, and/or the like. Alternatively, the test device might comprise at least one of a server computer, a cloud computing-based test device, a desktop computer, or a network server node.

In some cases, the method might further comprise generating a unique identifier ("unique ID") for the target app. In some embodiments, the method might further comprise storing the captured one or more data streams in a database for later analysis. Alternatively, or additionally, the method might further comprise generating or validating Certificate of Authority requests required by the client-side server, to validate user tokens that are used. In some cases, the method might further comprise storing each input and output request in a document with a unique identification associated with that particular input or output request. Alternatively, or additionally, the method might further comprise storing, in a database, harvested data intelligence that is loaded into the input and output requests, for at least one of later analysis or later reporting. In some embodiments, one of the input and output requests might comprise one or more hypertext transfer protocol ("HTTP") or secure HTTP ("HTTPS") requests, while the other of the input and output requests might comprise one or more HTTP or HTTPS responses. In some cases, the method might further comprise detecting and retaining forensic information during data exchange between the test device and the client-side server. The forensic information might comprise at least one of application identification ("app ID"), one or more API keys, advertiser network information, or payment processor information, and/or the like.

According to some embodiments, API use non-compliance is with respect to at least one of Terms of Service ("TOS") or Developer Agreement between a developer of the target app and the owner of the API, or the like. In some embodiments, API use non-compliance comprises at least one of unauthorized or improper use of a registered trademark, unauthorized manipulation or distortion of a registered trademark, unauthorized use of copyrighted material, unauthorized creation of confusingly similar copyrighted material, reverse engineering core products, websites, dashboards, or streams using the API, failure to verify that the target app is safe and secure, developing the target app without integrated error handling, using a deprecated API in the target app, improperly coding the target app, using an unapproved character set encoding, failing to implement safeguards to limit amount of data that can be requested from the API, using data from the API to create advertisements or marketing materials, using data from the API for targeted advertising campaigns, using the API to disrupt, negatively affect, or inhibit user experience, attempting to circumvent any content filtering techniques, using the API for any application that constitutes, promotes, or is used in connection with spyware, adware, or any other malicious programs or code, using data that is harvested or scraped from a website belonging to the owner of the API to supplement data provided from the API, using multiple member tokens to circumvent any restrictions put in place by the platform, attempting to access restricted services through the use of the API, or copying or distributing any object related code that calls the API, and/or the like.

In yet another aspect, a test device might comprise at least one processor and a non-transitory computer readable medium in communication with the at least one processor. The computer readable medium might have stored thereon computer software comprising a set of instructions that, when executed by the at least one processor, causes the test device to: download and install, from an on-line app store, a target application ("app") that has been identified as being potentially non-compliant in terms of use of an application programming interface ("API") that is part of the target app; establish and interact with, within one of the test device or a network to which the test device is communicatively coupled, a virtual environment, the virtual environment being configured to simulate replication of a validation process for the target app and to forward validation requests to a client-side server associated with an owner of the API; capture one or more data streams for input and output requests during data exchange between the test device and the client-side server; and analyze the captured one or more data streams to determine whether API use by the target app is compliant.

In some embodiments, the test device is a mobile device comprising at least one of a tablet computer, a laptop computer, a smart phone, a mobile phone, or a mobile testing device, and/or the like. Alternatively, the test device might comprise at least one of a server computer, a cloud computing-based test device, a desktop computer, or a network server node.

In still another aspect, a system might comprise a test device and a client-side server. The test device might comprise at least one first processor and a first non-transitory computer readable medium in communication with the at least one first processor. The first non-transitory computer readable medium might have stored thereon computer software comprising a set of instructions that, when executed by the at least one processor, causes the test device to: download and install, from an on-line app store, a target application ("app") that has been identified as being potentially non-compliant in terms of use of an application programming interface ("API") that is part of the target app; establish and interact with, within one of the test device or a network to which the test device is communicatively coupled, a virtual environment, the virtual environment being configured to simulate replication of a validation process for the target app and to forward validation requests to a client-side server associated with an owner of the API; capture one or more data streams for input and output requests during data exchange between the test device and the client-side server; and analyze the captured one or more data streams to determine whether API use by the target app is compliant. The client-side server might comprise at least one second processor and a second non-transitory computer readable medium in communication with the at least second one processor. The second non-transitory computer readable medium might have stored thereon computer software comprising a set of instructions that, when executed by the at least one second processor, causes the client-side server to exchange data streams for input and output requests with the test device.

In another aspect, another method might be provided for automatically auditing a developer channel for use compliance. The method might comprise identifying misuse of an application programming interface ("API") that is used in a developer channel. In some embodiments, identifying misuse of the API that is used in the developer channel might comprise intercepting data streams between the API and one or more computing systems, parsing the intercepted data streams, and determining whether the API is use non-compliant, based at least in part on identifying use non-compliant characteristics in the parsed data streams.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

Figure 5:
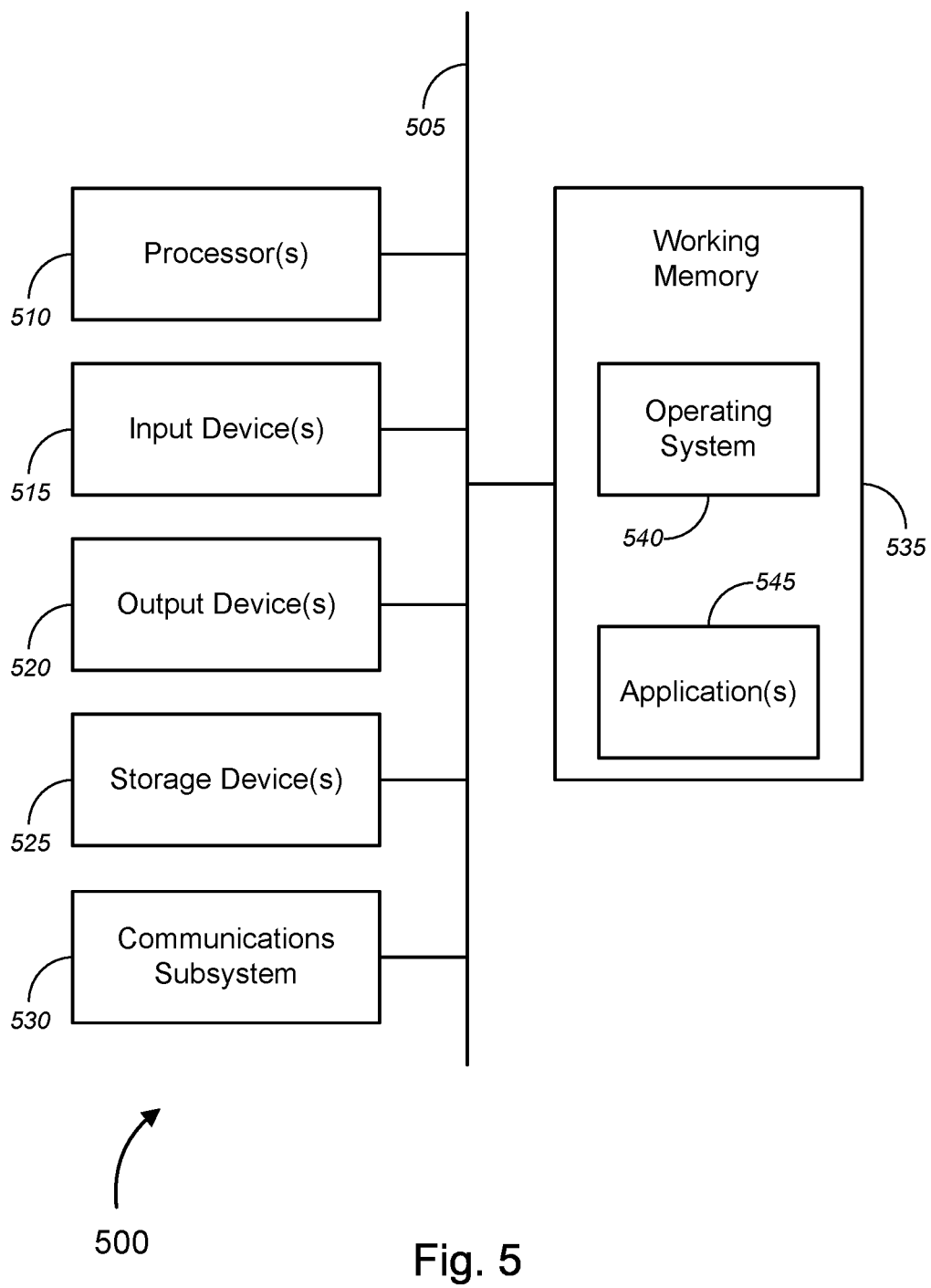
FIG. 5 is a block diagram illustrating an exemplary computer or system hardware architecture, in accordance with various embodiments.
Figure 6:
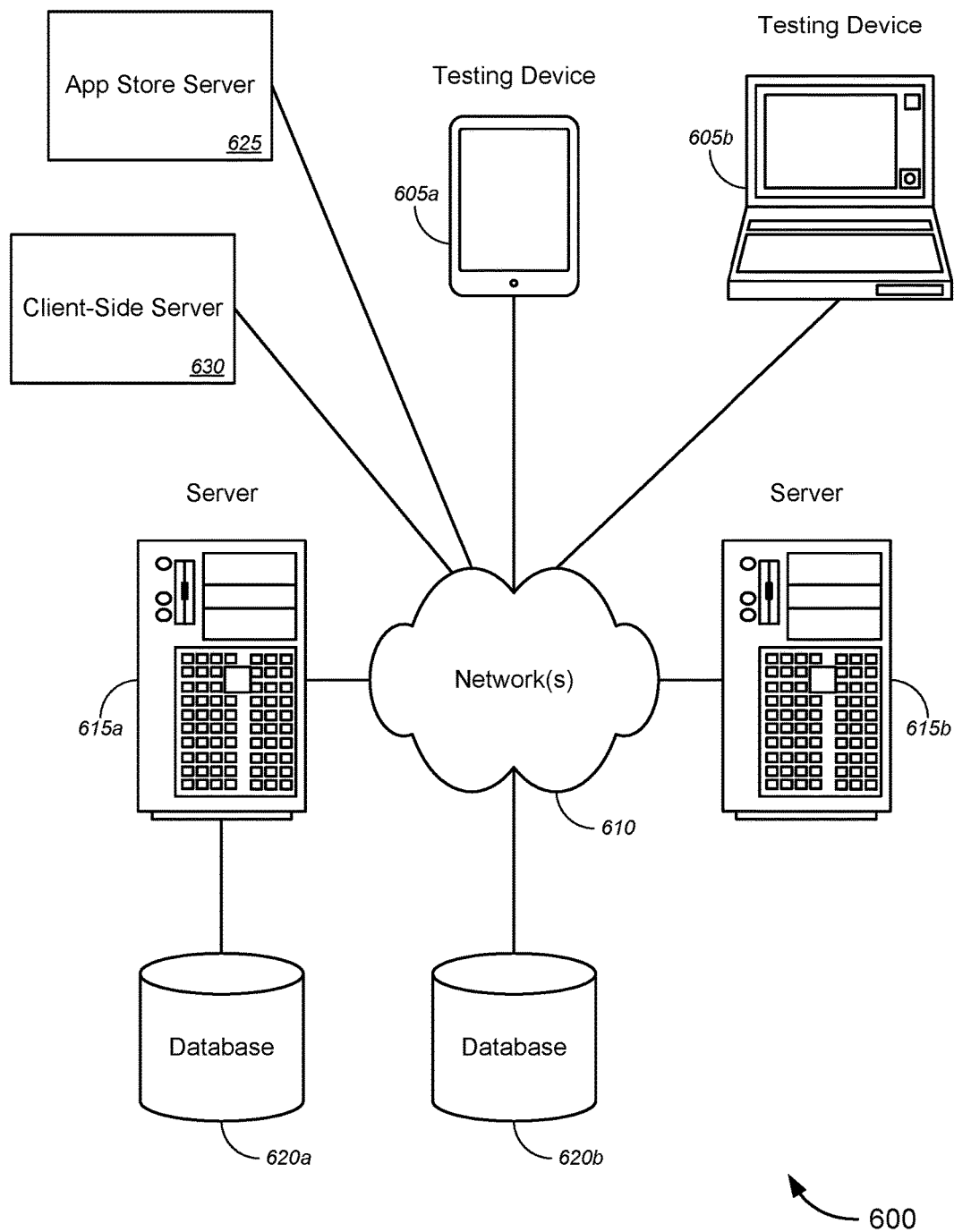
FIG. 6 is a block diagram illustrating a networked system of computers, computing systems, or system hardware architecture, which can be used in accordance with various embodiments.

We now turn to the embodiments as illustrated by the drawings. FIGS. 1-6 illustrate some of the features of the method, system, and apparatus for implementing application auditing for API use compliance, as referred to above. FIGS. 1-4 illustrate some of the specific (although non-limiting) exemplary features of the method, system, and apparatus for implementing application auditing for API use compliance, while FIGS. 5 and 6 illustrate exemplary system and hardware implementation. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing application auditing for API use compliance, in accordance with various embodiments. In the embodiment of FIG. 1, system 100 might comprise one or more user devices or test devices 105, which might include, without limitation, a desktop computer 105*a*, a laptop computer 105*b*, a server computer 105*c*, and/or one or more mobile user devices or mobile test devices 110, which might include, but are not limited to, a tablet computer 110*a*, a smart phone 110*b*, a mobile phone 110*c*, and/or other testing devices 110*d* (which might be any suitable computing device that can establish or host a virtual environment for performing the processes described below and with respect to FIGS. 2-4).

In some instances, network 115 can include, but is not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network 115 might include an access network of the service provider (e.g., an Internet service provider ("ISP")). In another embodiment, the network 115 might include a core network of the service provider, and/or the Internet. According to some embodiments, the network 115 might include a software defined network ("SDN"), or the like.

System 100 might further comprise a plurality of servers that are communicatively coupled to the one or more user devices or test devices 105 and/or the one or more mobile user devices or mobile test devices 110 via network 115, and in some cases via one or more telecommunications relay systems 120. The one or more telecommunications relay systems 120 might include, without limitation, one or more wireless network interfaces (e.g., wireless modems, wireless access points, and the like), one or more towers, one or more satellites, and the like.

According to some embodiments, the plurality of servers might include, without limitation, at least one of an application programming interface ("API") owner server(s) 125, an application ("app") developer server(s) 135, a target app detection server(s) 145, a third party server(s) 155, and/or a client-side server(s) 170, and/or the like, which might communicatively couple to database 130, database 140, database 150, database 160, and database 175, respectively. In some cases, the client-side server(s) 170 might include one or more of the API owner server 125, the app developer server 135, the target app detection server 145, and/or the like.

System 100 might further comprise application and developer intelligence database 165 in communication with network 115. The database 165 might store harvested data or captured data streams. In some cases, database 165 might store metadata containing information including, but not limited to, application identifiers ("IDs"), API keys, client-owned sites, advertising networks, character-set encoding, and/or the like. In some instances, database 165 might store user IDs, API IDs, and/or the like.

The components of system 100, described above, are configured to implement application auditing for API use compliance, as described in detail below with respect to FIGS. 2-4. However, the various embodiments are not so limited, and system 100 may implement embodiments of application auditing for API use compliance that are equivalent to (but different) from the specific embodiments as described with respect to FIGS. 2-4.

Figure 2:
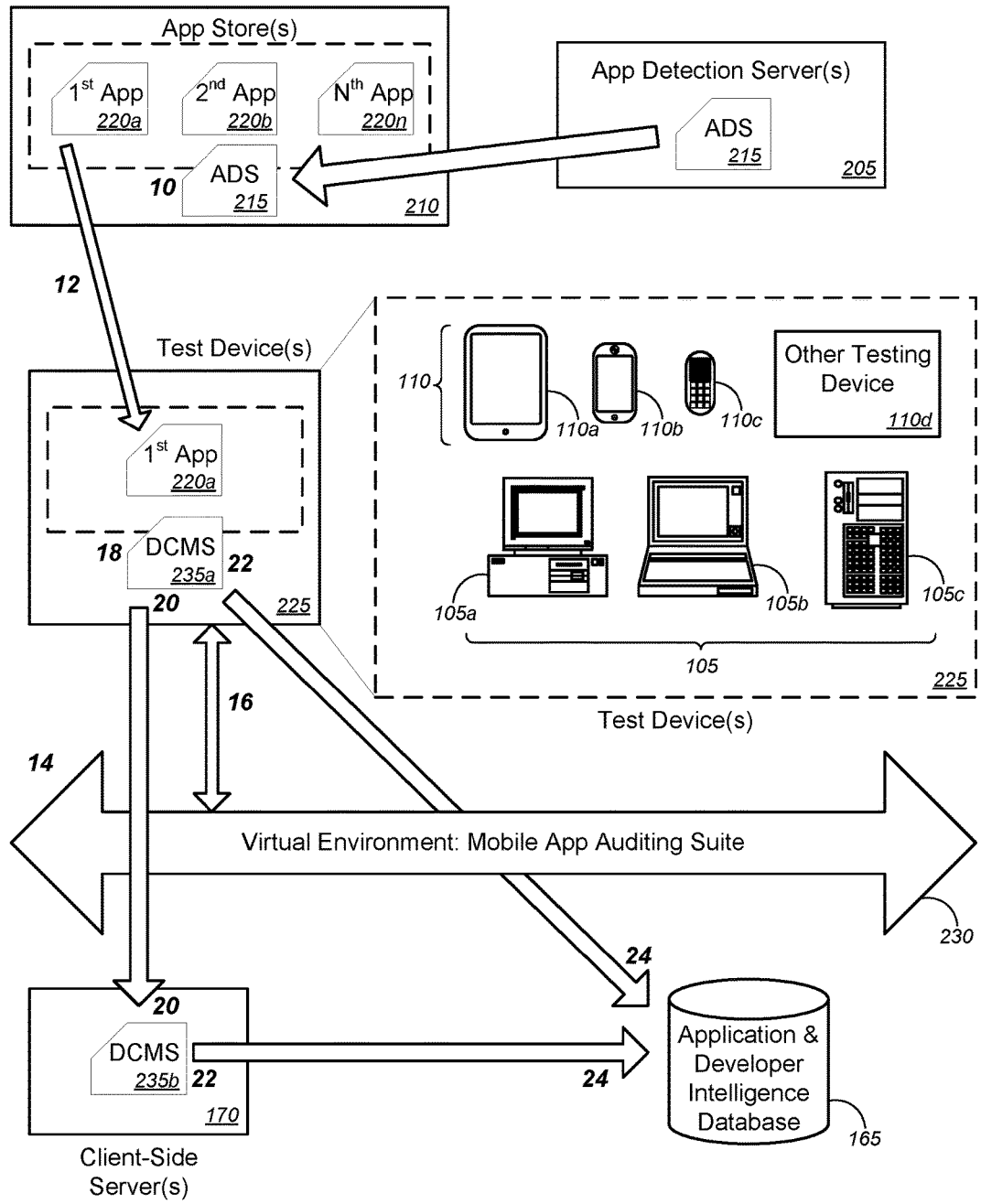
FIG. 2 is a schematic diagram illustrating another system for implementing application auditing for API use compliance, in accordance with various embodiments.

FIG. 2 is a schematic diagram illustrating another system 200 for implementing application auditing for API use compliance, in accordance with various embodiments.

The application detection software ("ADS") 215—which might include, without limitation, AppDetex Software, which is a proprietary technology, and/or similar application detection software, or the like—is technology or software technology that is used to detect applications in the major online app-stores (e.g., app stores 210). The ADS 215 is accessible or downloadable from an app detection server(s) 205, from the Cloud, and/or from the app store 210, and/or the like. This ADS 215 software harvests app store data at pre-determined intervals, parsing out each field type and saving into a database. The ability to search, sort, filter, or otherwise manipulate this normalized data allows detection of mobile applications that exhibit the most obvious indicators that (a) an official API is in use and (b) there is a strong likelihood that the application is violating the API owner's official Terms of Service.

The Test Devices 225 (which might include, without limitation, one or more test devices 105, including, but not limited to, a desktop computer 105a, a laptop computer 105b, a server computer 105c, and/or one or more mobile user devices or mobile test devices 110, including, but not limited to, a tablet computer 110a, a smart phone 110b, a mobile phone 110c, and/or other testing devices 110d of FIG. 1, and/or the like) are mobile application platforms that are used to capture data streams transmitted to and from the device. The test devices 225 are configured to specifically interact with developer compliance monitoring system ("DCMS") 235—which might include, without limitation, DevCom technology, which is another proprietary technology, and/or similar developer compliance monitoring technology, or the like—that provides full transparency into the requests made by the device, and each corresponding response. The information that is required to interact with various forms of security such as using secure sockets layer ("SSL") or the like, requires creation of trusted certificates on each device, which allows the DCMS 235 (e.g., the DevCom technology and/or the like) to be authenticated internally, before interacting with the official API.

The Virtual Environment 230 is a specific network configuration that is used during the testing of mobile applications. The testing environment that is deployed consists of a specifically configured network used to isolate the connection from the test device 225 to the network (e.g., network 115 of FIG. 1, and/or the like). This allows simulation of the replication of the validation process internally, and then forwarding of those requests to the API service.

The Client-Side Server 170 is where the requests (e.g., hyptertext transfer protocol ("HTTP") requests and/or secure HTTP ("HTTPS") or the like; herein also referred to as "transfer protocol requests"; "HTTP/HTTPS requests"; or "user requests") are being sent in order to interact with the API interface. This server 170 is capable of input and output once the validation of certificates has been completed within the virtual environment 230, and is interpreted by the platform API. After these responses are received, several areas of functionality can easily be validated, including, but not limited to, addressing the following questions: (1) Does the application interact with the API correctly? Or (2) was the token request valid, and/or accepted by the platform so that it can interact with the API platform?

The Application & Developer Intelligence Database 165 stores harvested data from DCMS 235 (e.g., DevCom, and/or the like), allowing the clustering of data for further analysis and reporting. The system 200 has the ability to cluster some of the data flows that are captured, and make connections amongst both mobile applications and developers through meta-data including, without limitation: (1) Application ID's; (2) API Keys; (3) Client Owned Sites; (4) Advertising Networks; (5) Character-Set Encoding; and/or the like.

With reference to FIG. 2, at process 10, infringing applications are identified using the ADS 215 (e.g., AppDetex technology, and/or the like), or from client provided intelligence on current developers, the ADS 215 being accessible or downloadable from app detection server(s) 205, from the Cloud, and/or from the app store 210, and/or the like.

At process 12, targeted mobile applications 220 (including one or more of a first app 220a, a second app 220b, through an N$^{th}$ app 220n, and/or the like) are downloaded from app stores 210 (including, but not limited to, iTunes, Google Play, Windows Store, Amazon.com, etc.) and are installed on test devices 225. For example, targeted applications 210 can be defined as those applications which are using a registered trademark in the Title or Description of the application, or using a registered copyrighted image or logo. The DCMS 235 (e.g., DevCom technology, and/or the like) can also function given a list of Applications provided by API holders. The ADS 215 (e.g., AppDetex Software, and/or the like), in some embodiments, might identify such target applications 220 by searching for word marks and/or by performing image analysis, detection, and/or comparison to look for graphical marks (i.e., symbolic, design, picture, etc.). In alternative or additional embodiments, the ADS 215 (e.g., AppDetex Software, and/or the like) might identify such target applications 220 by searching for copyrighted words/passages and/or copyrighted graphics/images. In this manner, the system 200 can gather the information and, in many cases, can assist an analyst by providing search, filter, and/or sort tools that enable the analyst to zero-in on potentially violating apps.

At process 14, a virtual environment (network) 230 is created prior to the scanning process, allowing replication of the user experience with the app 220, while capturing the binary data (or other data) that is present in web data flows. The virtual environment 230 is capable of replicating the connect request initiated by test devices 225, may validate those credentials that are sent, and then may handle the response from the client-side server, or API. For example, virtual environment 230 allows watching or monitoring of all of the requests that are being inputted and outputted at the API level, specific to the testing device 225 being used. Virtual environment 230 concurrently surveys the flow of information that is contained in the: (1) header information, (2) HTTP/HTTPS requests, and (3) HTTP/HTTPS responses. For example, based on the project scope, the system 200 can examine a wide variety of both internal and external information that is captured in system 200, including, without limitation, API Version, Unique User Identifier's ("UUID"), Authorization Certificates Sent (Response Received), and/or the like.

At process 16, each test device 225 is configured to interact with the virtual environment 230 that is created, thus allowing the interaction with systems that collect or aid in the collection of investigative material, including, but not limited to, network traffic, screenshots, audio, and video, or the like. A unique-ID is generated for each app 220 being analyzed and is associated with that app 220, prior to entering the DCMS 235 (e.g., DevCom system, and/or the like).

At process 18, the application 220 (in this non-limiting example, first app 220a) is then tested on test devices 225 that are configured with DCMS 235a (e.g., the DevCom technology, and/or the like). This, in some embodiments, requires using the API functionality within the app, or any other functions laid out in the project plan. During this process, system 200 will be facilitating the processing of HTTP/HTTPS requests, allowing the user a form of transparency as to how the application integrates between both Web Services and API platforms.

At process 20, while data is transmitted from the testing device, to the client-side server, the DCMS 235 (which might be one or both of DCMS 235a running on the test device 225 and/or DCMS 235b (individually or collectively, "DCMS 235") running on the client-side server(s) 170; e.g., DevCom technology, and/or the like in either instance) captures data streams for both HTTP/HTTPS requests in real time, and stores these data logs, and at the end process, into a database for further analysis. Additionally, the DCMS 235 (e.g., the DevCom technology, and/or the like) is capable of generating and validating Certificate of Authority requests (or the like) required by the client side server 170, in order to validate any user tokens being used. By internalizing this process prior to interacting with the API, a much better picture may be provided as to how the app 220 functions from a user perspective. The DCMS 235 (e.g., DevCom technology, and/or the like) has the ability to store each request and response in a document with a unique identifier ("ID") associated with that particular HTTP/HTTPS transaction.

At process 22, the DCMS 235 (e.g., the DevCom technology, and/or the like) is able to detect and retain digital forensic information (including, without limitation, application ID's, API keys, advertiser networks, payment processors, etc.) during the input and output of data streams. For example, if the API owner requires the developer to deploy a specific analytics platform, such as Google Analytics, it can be detected if this particular platform is being used. In addition to this, the UUID associated with that particular analytics account can also be detected.

At process 24, harvested data intelligence that is loaded into HTTP requests are stored for further analysis, and reporting. The data that is located in the Developer & Application Intelligence Database 165 is analyzed, and clustered in order to identify if any other relationships may exist between both applications and developers alike, and connections can then be established. This can lead to uncovering larger networks of developers, and high value targets. For example, some API platforms require that each app use different set up API keys, so that they are able to isolate abuse to a single app, rather than multiple apps. In some embodiments, determining whether API use is compliant (under TOS or under Developer Agreement) may be related (either directly or indirectly) with at least one of validation of certificates, validation of tokens, validation of requests, and/or the like. That is, with certain cooperation with the API owner, the system 200 could look for certain authentication credentials for determining compliance. But, more often, the system 200 might detect compliance issues based on app properties. Also, the API owner has the information and the system 200 can compare what it has or what was found against its database.

Figure 3:
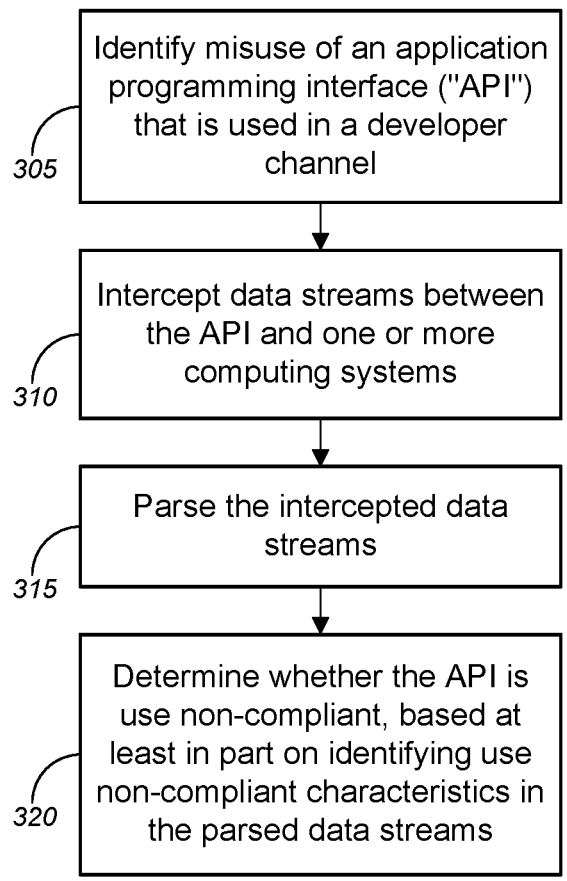
FIG. 3 represents a system flow diagram illustrating a method for implementing application auditing for API use compliance, in accordance with various embodiments.

FIG. 3 represents a system flow diagram illustrating a method 300 for implementing application auditing for API use compliance, in accordance with various embodiments. The embodiments as represented in FIG. 3 are merely illustrative and are not intended to limit the scope of the various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 3 can be implemented by or with (and, in some cases, are described below with respect to) the systems 100 and 200 of FIGS. 1 and 2, respectively (or components thereof), such methods may also be implemented using any suitable hardware implementation. Similarly, while each of the systems 100 and 200 of FIGS. 1 and 2, respectively (or components thereof), can operate according to the method illustrated by FIG. 3 (e.g., by executing instructions embodied on a computer readable medium), the systems 100 and 200 can each also operate according to other modes of operation and/or perform other suitable procedures.

In the embodiment of FIG. 3, method 300, at block 305, might comprise identifying misuse of an application programming interface ("API") that is used in a developer channel. In some embodiments, identifying misuse of the API that is used in the developer channel might comprise intercepting data streams between the API and one or more computing systems (block 310), parsing the intercepted data streams (block 315), and determining whether the API is use non-compliant, based at least in part on identifying use non-compliant characteristics (i.e., characteristics of non-compliant use) in the parsed data streams (block 320).

Figure 4A:
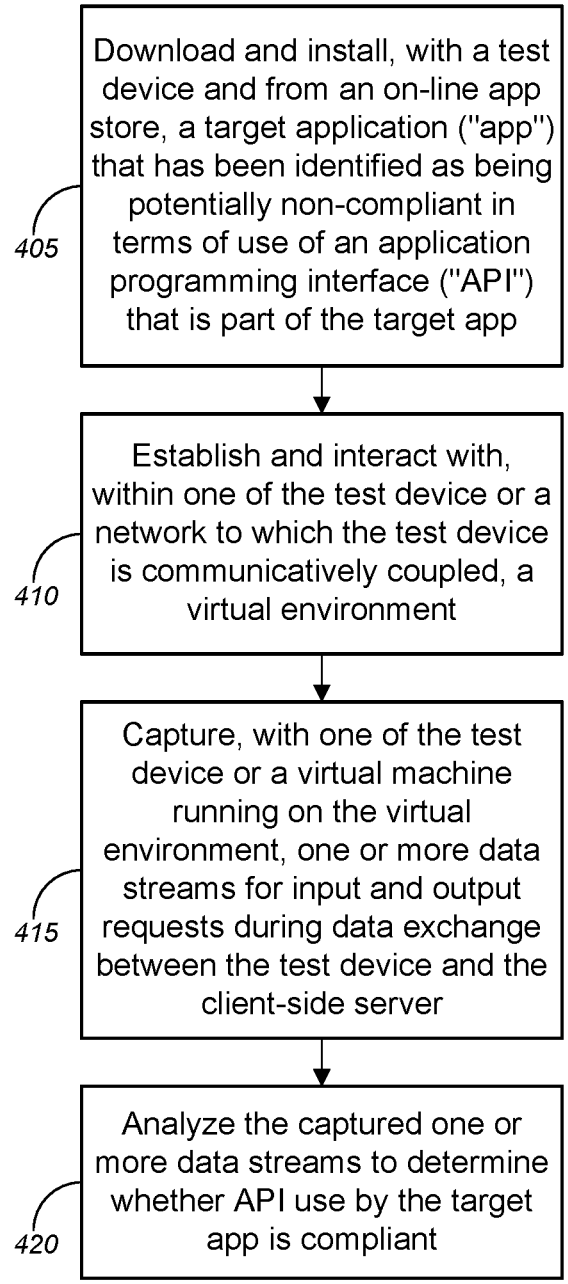
FIGS. 4A and 4B represent a system flow diagram illustrating another method for implementing application auditing for API use compliance, in accordance with various embodiments.
Figure 4B:
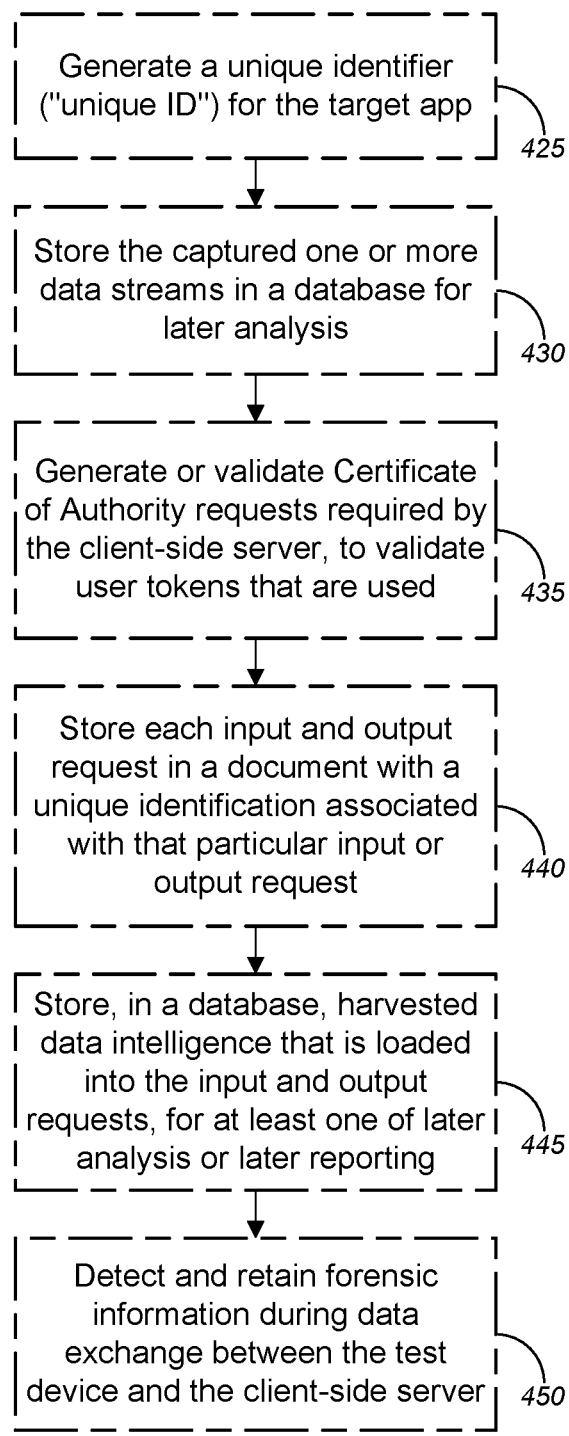

FIGS. 4A and 4B (collectively, "FIG. 4") represent a system flow diagram illustrating another method 400 for implementing application auditing for API use compliance, in accordance with various embodiments. The embodiments as represented in FIG. 4 are merely illustrative and are not intended to limit the scope of the various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by or with (and, in some cases, are described below with respect to) the systems 100 and 200 of FIGS. 1 and 2, respectively (or components thereof), such methods may also be implemented using any suitable hardware implementation. Similarly, while each of the systems 100 and 200 of FIGS. 1 and 2, respectively (or components thereof), can operate according to the method illustrated by FIG. 4 (e.g., by executing instructions embodied on a computer readable medium), the systems 100 and 200 can each also operate according to other modes of operation and/or perform other suitable procedures.

In the embodiment of FIG. 4A, method 400, at block 405, might comprise downloading and installing, with a test device and from an on-line app store, a target application ("app") that has been identified as being potentially non-compliant in terms of use of an application programming interface ("API") that is part of the target app. At block 410, method 400 might comprise establishing and interacting with, within one of the test device or a network to which the test device is communicatively coupled, a virtual environment. In some instances, the virtual environment might be configured to simulate replication of a validation process for the target app and to forward validation requests to a client-side server associated with an owner of the API. Method 400, according to some embodiments, might further comprise capturing, with one of the test device or a virtual machine running on the virtual environment, one or more data streams for input and output requests during data exchange between the test device and the client-side server (block 415) and analyzing the captured one or more data streams to determine whether API use by the target app is compliant (block 420).

Merely by way of example, in some aspects, API use compliance or non-compliance is with respect to at least one of Terms of Service ("TOS") or Developer Agreement between a developer of the target app and the owner of the API, or the like. In some cases, API use non-compliance might include, without limitation, at least one of unauthorized or improper use of a registered trademark, unauthorized manipulation or distortion of a registered trademark, unauthorized use of copyrighted material, unauthorized creation of confusingly similar copyrighted material, reverse engineering core products, websites, dashboards, or streams using the API, failure to verify that the target app is safe and secure, developing the target app without integrated error handling, using a deprecated API in the target app, improperly coding the target app, using an unapproved character set encoding, failing to implement safeguards to limit amount of data that can be requested from the API, using data from the API to create advertisements or marketing materials, using data from the API for targeted advertising campaigns, using the API to disrupt, negatively affect, or inhibit user experience, attempting to circumvent any content filtering techniques, using the API for any application that constitutes, promotes, or is used in connection with spyware, adware, or any other malicious programs or code, using data that is harvested or scraped from a website belonging to the owner of the API to supplement data provided from the API, using multiple member tokens to circumvent any restrictions put in place by the platform, attempting to access restricted services through the use of the API, or copying or distributing any object related code that calls the API, and/or the like.

According to some embodiments, the test device might be a mobile device comprising at least one of a tablet computer, a laptop computer, a smart phone, a mobile phone, or a mobile testing device, and/or the like. Alternatively, or additionally, the test device might include, but is not limited to, at least one of a server computer, a cloud computing-based test device, a desktop computer, or a network server node, and/or the like.

In one non-limiting example, the test device (and/or a virtual machine ("VM") running in the virtual environment) (i.e., test device 105 or 110 and/or a VM running in a virtual environment established in the test device 105 or 110 or in network 115 of FIG. 1; or corresponding components of FIG. 2) might analyze the captured one or more data streams by performing at least one of a word search of captured one or more data streams for any registered word marks (particularly, to determine unauthorized or improper use of the registered word mark), an image comparison, detection, and/or analysis of any images contained in the one or more data streams to identify any registered graphically marks (e.g., symbols, designs, pictures, etc.) (particularly, to determine unauthorized or improper use of the registered graphical mark), a word search of captured one or more data streams for any copyrighted words, slogans, or passages (particularly, to determine unauthorized or improper use of the copyrighted material), an image comparison, detection, and/or analysis of any images contained in the one or more data streams to identify any copyrighted graphical and/or image-based materials (e.g., symbols, designs, pictures, drawings, photographs, etc.) (particularly, to determine unauthorized or improper use of the copyrighted material), and/or the like.

We now turn to FIG. 4B, which depicts a number of optional processes that may be performed in addition to the processes of blocks 405-420 of FIG. 4A. For example, method 400, at optional block 425, might comprise generating a unique identifier ("unique ID") for the target app. Alternatively, or in addition, method 400 might further comprise, at optional block 430, storing the captured one or more data streams in a database for later analysis. In yet another alternative embodiment, method 400 might further comprise generating or validating Certificate of Authority requests required by the client-side server, to validate user tokens that are used (optional block 435). At optional block 440, method 400 might, alternatively or additionally, comprise storing each input and output request in a document with a unique identification associated with that particular input or output request. In another alternative or additional embodiment, method 400, at optional block 445, might comprise storing, in a database, harvested data intelligence that is loaded into the input and output requests, for at least one of later analysis or later reporting. In some instances, one of the input and output requests might comprise one or more hypertext transfer protocol ("HTTP") or secure HTTP ("HTTPS") requests, while the other of the input and output requests might comprise one or more HTTP or HTTPS responses. Alternatively, or additionally, method 400 might further comprise detecting and retaining forensic information during data exchange between the test device and the client-side server (optional block 450). In some cases, the forensic information comprises at least one of application identification ("app ID"), one or more API keys, advertiser network information, or payment processor information.

Exemplary System and Hardware Implementation

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of the computers or computing systems 105, 110, 125, 135, 145, 155, 170, 205, 225, and/or the like, VMs or virtual environments 230 and/or the like running on these computers or computing systems, user devices or computing systems in communication with any of these devices, and/or the like, as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computers or computing systems 105, 110, 125, 135, 145, 155, 170, 205, 225, and/or the like, VMs or virtual environments 230 and/or the like running on these computers or computing systems, user devices or computing systems in communication with any of these devices, or of any other device, as described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

As noted above, a set of embodiments comprises methods and systems for implementing application auditing for API use compliance. FIG. 6 illustrates a schematic diagram of a system 600 that can be used in accordance with one set of embodiments. The system 600 can include one or more user computers or user devices 605 (also referred to herein as testing devices 605). A user computer or user device (or testing device) 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device (or testing device) 605 can also have any of a variety of applications, including one or more applications configured to perform methods provided by various embodiments (as described above, for example), as well as one or more office applications, database client and/or server applications, and/or web browser applications. Alternatively, a user computer or user device (or testing device) 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers or user devices (or testing device) 605, any number of user computers or user devices (or testing device) can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention. According to some embodiments, the server computers 615 might include one or more of an application programming interface ("API") owner server(s) 125, an application ("app") developer server(s) 135, a target app detection server(s) 145, a third party server(s) 155, and/or a client-side server(s) 170, and/or the like.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 605 and/or another server 615. In some embodiments, an application server can perform one or more of the processes for implementing application auditing for API use compliance, or the like, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer or user device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer or user device 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example. In some embodiments, the servers 615 (which might include servers 125, 135, 145, 155, 165, and 170) might communicatively couple with databases 620 (which might include database 130, database 140, database 150, database 160, and database 175, respectively). Database 620 might further include application and developer intelligence database (e.g., application and developer intelligence database 165 of FIG. 1).

According to some embodiments, system 600 might further comprise one or more app store servers 625 and/or one or more client-side servers 630, as described in detail above with respect to FIGS. 1-4. In some embodiments, one or more of the user device 605a, the user device 605b, the server 615a, the server 615b, the database 620a, and/or the database 620b might be in the same network 610 as one of the one or more app store servers 625 and/or one or more client-side servers 630. In alternative or additional embodiments, one or more of the user device 605a, the user device 605b, the server 615a, the server 615b, the database 620a, and/or the database 620b might be in a first network 610 that is different from another network(s) 610 in which each of the one or more app store servers 625 and/or one or more client-side servers 630 are located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for automatically auditing a developer channel for use compliance, comprising:
   identifying, with a first computer, a target application ("app") in an on-line app store that may be non-compliant in terms of use of an application programming interface ("API"), wherein API use non-compliance comprises at least one of:
   reverse engineering core products, websites, dashboards, or streams using the API;
   developing the target app without integrated error handling;
   using a deprecated API in the target app;
   improperly coding the target app;
   using an unapproved character set encoding;
   failing to implement safeguards to limit amount of data that can be requested from the API;
   using data from the API to create advertisements or marketing materials;
   using data from the API for targeted advertising campaigns;
   attempting to circumvent any content filtering techniques;
   using multiple member tokens to circumvent any restrictions put in place by the platform;
   attempting to access restricted services through the use of the API; or
   copying or distributing any object related code that calls the API;
   downloading and installing, with a test device, the target app on the test device;
   establishing a virtual environment in a network to which the test device is connected, the virtual environment being configured to simulate replication of a validation process for the target app and to forward validation requests to a second computer associated with a service provider that owns the API ("API owner"), wherein the virtual environment monitors all requests being inputted and outputted at an API level, wherein the virtual environment replicates user experience with the target app, and wherein the virtual environment comprises a specifically configured network used to isolate a connection from the test device to the specifically configured network;
   surveying, with the virtual environment, at least one flow of information to or from the target app via the API;
   generating a unique identifier ("unique ID") for the target app;
   testing, with the test device, the target app;
   transmitting, with the test device, data to a client-side server;
   capturing one or more data streams travelling both ways between the test device and the client-side server while the data is being transmitted from the test device to the client-side server;
   storing, in a database in or communicatively coupled with the virtual environment, at least one of the captured one or more data streams or a log of the captured one or more data streams; and
   generating and validating one or more certificate of authority requests required by the client-side server.

2. The method of claim 1, wherein identifying, with the first computer, the target app comprises identifying, with the first computer, characteristics of an app that are indicative of non-compliant use of the API.

3. The method of claim 2, wherein the characteristics of the app that are indicative of non-compliant use of the API include both indicators that an official version of the API is in use and indicators that there is a strong likelihood that the target app is violating use policies under an official Terms of Service of the API owner that is agreed to by a developer of the target app.

4. The method of claim 1, wherein identifying, with the first computer, the target app comprises receiving, with the first computer, information from at least one of the API owner or a third party identifying the target app as potentially being use non-compliant.

5. The method of claim 1, wherein the information in the flow of information to or from the target app via the API comprises at least one of information indicating API version, unique user identifier ("UUID") associated with a user using the target app, information indicating that authorization certificates have been sent, the authorization certificates, or the unique ID for the target app.

6. The method of claim 5, wherein the information in the flow of information to or from the target app via the API is obtained from at least one of header information, one or more hypertext transfer protocol ("HTTP") or secure HTTP ("HTTPS") requests, or one or more HTTP or HTTPS responses.

7. The method of claim 6, wherein capturing the one or more data streams comprises capturing one or more data streams for each of the one or more HTTP or HTTPS requests or the one or more HTTP or HTTPS responses.

8. The method of claim 1, wherein the test device is a mobile device comprising at least one of a tablet computer, a laptop computer, a smart phone, a mobile phone, or a mobile testing device.

9. The method of claim 1, wherein the test device comprises at least one of a server computer, a cloud computing-based test device, a desktop computer, or a network server node.

10. The method of claim 1, further comprising:
    detecting and retaining forensic information during input and output data streams.

11. The method of claim 10, wherein the forensic information comprises at least one of application identification ("app ID"), one or more API keys, advertiser network information, or payment processor information.

12. A method, comprising:
    downloading and installing, with a test device and from an on-line app store, a target application ("app") that has been identified as being potentially non-compliant in terms of use of an application programming interface ("API") that is part of the target app;

establishing and interacting with, within one of the test device or a network to which the test device is communicatively coupled, a virtual environment, the virtual environment being configured to simulate replication of a validation process for the target app and to forward validation requests to a client-side server associated with an owner of the API, wherein the virtual environment monitors all requests being inputted and outputted at an API level, wherein the virtual environment replicates user experience with the target app, and wherein the virtual environment comprises a specifically configured network used to isolate a connection from the test device to the specifically configured network;

capturing, with one of the test device or a virtual machine running on the virtual environment, one or more data streams for input and output requests during data exchange between the test device and the client-side server; and analyzing the captured one or more data streams to determine whether API use by the target app is compliant, wherein API use non-compliance comprises at least one of:
  reverse engineering core products, websites, dashboards, or streams using the API;
  developing the target app without integrated error handling;
  using a deprecated API in the target app;
  improperly coding the target app;
  using an unapproved character set encoding;
  failing to implement safeguards to limit amount of data that can be requested from the API;
  using data from the API to create advertisements or marketing materials;
  using data from the API for targeted advertising campaigns;
  attempting to circumvent any content filtering techniques;
  using multiple member tokens to circumvent any restrictions put in place by the platform;
  attempting to access restricted services through the use of the API; or
  copying or distributing any object related code that calls the API.

13. The method of claim 12, wherein the test device is a mobile device comprising at least one of a tablet computer, a laptop computer, a smart phone, a mobile phone, or a mobile testing device.

14. The method of claim 12, wherein the test device comprises at least one of a server computer, a cloud computing-based test device, a desktop computer, or a network server node.

15. The method of claim 12, further comprising:
generating a unique identifier ("unique ID") for the target app.

16. The method of claim 12, further comprising:
storing the captured one or more data streams in a database for later analysis.

17. The method of claim 12, further comprising:
generating or validating Certificate of Authority requests required by the client-side server, to validate user tokens that are used.

18. The method of claim 12, further comprising:
storing each input and output request in a document with a unique identification associated with that particular input or output request.

19. The method of claim 12, further comprising:
storing, in a database, harvested data intelligence that is loaded into the input and output requests, for at least one of later analysis or later reporting.

20. The method of claim 12, wherein one of the input and output requests comprises one or more hypertext transfer protocol ("HTTP") or secure HTTP ("HTTPS") requests, while the other of the input and output requests comprises one or more HTTP or HTTPS responses.

21. The method of claim 12, further comprising:
detecting and retaining forensic information during data exchange between the test device and the client-side server.

22. The method of claim 21, wherein the forensic information comprises at least one of application identification ("app ID"), one or more API keys, advertiser network information, or payment processor information.

23. The method of claim 12, wherein API use non-compliance is with respect to at least one of Terms of Service ("TOS") or Developer Agreement between a developer of the target app and the owner of the API.

24. The method of claim 12, wherein API use non-compliance comprises at least one of unauthorized or improper use of a registered trademark; unauthorized manipulation or distortion of a registered trademark; unauthorized use of copyrighted material; unauthorized creation of confusingly similar copyrighted material; failure to verify that the target app is safe and secure; using the API for any application that constitutes, promotes, or is used in connection with spyware, adware, or any other malicious programs or code; or using data that is harvested or scraped from a website belonging to the owner of the API to supplement data provided from the API.

25. A test device, comprising:
  at least one processor; and
  a non-transitory computer readable medium in communication with the at least one processor, the computer readable medium having stored thereon computer software comprising a set of instructions that, when executed by the at least one processor, causes the test device to:
    download and install, from an on-line app store, a target application ("app") that has been identified as being potentially non-compliant in terms of use of an application programming interface ("API") that is part of the target app;
    establish and interact with, within one of the test device or a network to which the test device is communicatively coupled, a virtual environment, the virtual environment being configured to simulate replication of a validation process for the target app and to forward validation requests to a client-side server associated with an owner of the API, wherein the virtual environment monitors all requests being inputted and outputted at an API level, wherein the virtual environment replicates user experience with the target app, and wherein the virtual environment comprises a specifically configured network used to isolate a connection from the test device to the specifically configured network;
    capture one or more data streams for input and output requests during data exchange between the test device and the client-side server; and
    analyze the captured one or more data streams to determine whether API use by the target app is compliant, wherein API use non-compliance comprises at least one of:

reverse engineering core products, websites, dashboards, or streams using the API;
developing the target app without integrated error handling;
using a deprecated API in the target app;
improperly coding the target app;
using an unapproved character set encoding;
failing to implement safeguards to limit amount of data that can be requested from the API;
using data from the API to create advertisements or marketing materials;
using data from the API for targeted advertising campaigns;
attempting to circumvent any content filtering techniques;
using multiple member tokens to circumvent any restrictions put in place by the platform;
attempting to access restricted services through the use of the API; or
copying or distributing any object related code that calls the API.

26. A system, comprising:

a test device, comprising:
  at least one first processor; and
  a first non-transitory computer readable medium in communication with the at least one first processor, the first non-transitory computer readable medium having stored thereon computer software comprising a set of instructions that, when executed by the at least one first processor, causes the test device to:
    download and install, from an on-line app store, a target application ("app") that has been identified as being potentially non-compliant in terms of use of an application programming interface ("API") that is part of the target app;
    establish and interact with, within one of the test device or a network to which the test device is communicatively coupled, a virtual environment, the virtual environment being configured to simulate replication of a validation process for the target app and to forward validation requests to a client-side server associated with an owner of the API, wherein the virtual environment monitors all requests being inputted and outputted at an API level, wherein the virtual environment replicates user experience with the target app, and wherein the virtual environment comprises a specifically configured network used to isolate a connection from the test device to the specifically configured network;
    capture one or more data streams for input and output requests during data exchange between the test device and the client-side server; and
    analyze the captured one or more data streams to determine whether API use by the target app is compliant, wherein API use non-compliance comprises at least one of:
      reverse engineering core products, websites, dashboards, or streams using the API;
      developing the target app without integrated error handling;
      using a deprecated API in the target app;
      improperly coding the target app;
      using an unapproved character set encoding;
      failing to implement safeguards to limit amount of data that can be requested from the API;
      using data from the API to create advertisements or marketing materials;
      using data from the API for targeted advertising campaigns;
      attempting to circumvent any content filtering techniques;
      using multiple member tokens to circumvent any restrictions put in place by the platform;
      attempting to access restricted services through the use of the API; or
      copying or distributing any object related code that calls the API; and
the client-side server, comprising:
  at least one second processor; and
  a second non-transitory computer readable medium in communication with the at least second one processor, the second non-transitory computer readable medium having stored thereon computer software comprising a set of instructions that, when executed by the at least one second processor, causes the client-side server to:
    exchange data streams for input and output requests with the test device.

* * * * *